(12) United States Patent
Morello (10) Patent No.: US 7,114,754 B2
(45) Date of Patent: Oct. 3, 2006

(54) MOBILE CONSTRUCTION SUPPORT VEHICLE

(75) Inventor: Frederick Morello, Johnstown, PA (US)

(73) Assignee: M.I.C. Industries, Inc., Reston, VA (US)

( * ) Notice: Subject to any disclaimer, the term of this patent is extended or adjusted under 35 U.S.C. 154(b) by 0 days.

(21) Appl. No.: 10/779,059

(22) Filed: Feb. 13, 2004

(65) Prior Publication Data

US 2005/0179276 A1 Aug. 18, 2005

(51) Int. Cl.
*B60P 3/14* (2006.01)
(52) U.S. Cl. .................................................. 296/24.32
(58) Field of Classification Search ............ 296/24.32, 296/37.6, 51, 24.38, 25, 24.3, 35.3, 26.14, 296/24.1; 72/321, 319; 312/249.13, 100; 137/234.6; 404/75; 222/181.2; 269/71; 52/173.2; 118/64; 219/134, 86.31, 125.12; 244/116; 73/152.39
See application file for complete search history.

(56) References Cited

U.S. PATENT DOCUMENTS

| | | | | | |
|---|---|---|---|---|---|
| 1,612,980 | A | * | 1/1927 | Royal .......................... | 296/37.6 |
| 2,192,207 | A | * | 3/1940 | Stahl ......................... | 296/24.32 |
| 2,220,650 | A | * | 11/1940 | Herzog ..................... | 296/24.32 |
| 2,233,181 | A | * | 2/1941 | Quartullo ..................... | 296/25 |
| D132,712 | S | * | 6/1942 | Troche et al. ............. | 296/24.32 |
| 2,358,446 | A | * | 9/1944 | Couse ..................... | 296/24.32 |
| 2,365,940 | A | * | 12/1944 | Couse ..................... | 296/24.32 |
| D141,291 | S | * | 5/1945 | Powers ..................... | 296/24.32 |
| 2,449,707 | A | * | 9/1948 | Leathers ................... | 219/86.31 |
| 2,530,578 | A | * | 11/1950 | Hotop ...................... | 296/24.32 |
| D166,530 | S | * | 4/1952 | Couse ..................... | 296/24.32 |
| 2,719,748 | A | * | 10/1955 | Tilley ....................... | 296/24.32 |
| 2,811,111 | A | * | 10/1957 | Levitz et al. ............. | 296/24.32 |
| 3,258,019 | A | * | 6/1966 | Bellas et al. ................ | 296/24.3 |
| 3,308,845 | A | * | 3/1967 | Bellas et al. ............. | 137/234.6 |
| 3,380,280 | A | * | 4/1968 | Wise ............................ | 72/319 |
| 3,399,794 | A | * | 9/1968 | Hummel .................... | 296/35.3 |
| 3,633,970 | A | * | 1/1972 | Langhals .................. | 296/24.32 |
| 3,815,965 | A | * | 6/1974 | Ostwald ..................... | 312/100 |
| 3,844,158 | A | * | 10/1974 | Mercer ..................... | 296/24.32 |
| 3,877,279 | A | * | 4/1975 | Van Cleave ................. | 72/319 |
| 4,055,206 | A | * | 10/1977 | Griffin ..................... | 296/24.32 |
| 4,133,572 | A | * | 1/1979 | Robbins et al. .......... | 296/24.32 |
| 4,171,114 | A | * | 10/1979 | Marden ..................... | 244/116 |
| 4,230,358 | A | * | 10/1980 | Legueu ..................... | 296/24.32 |
| 4,352,282 | A | * | 10/1982 | Buske et al. .................. | 72/321 |
| 4,359,846 | A | * | 11/1982 | Votteler ..................... | 52/173.2 |
| 4,431,902 | A | * | 2/1984 | Wallen .................. | 219/125.12 |
| 4,516,308 | A | * | 5/1985 | Urban ..................... | 296/24.32 |
| 4,643,476 | A | * | 2/1987 | Montgerard ............. | 296/24.32 |

(Continued)

*Primary Examiner*—Kiran B. Patel
(74) *Attorney, Agent, or Firm*—Jones Day (57) ABSTRACT

A vehicle for use in the construction trade to support steel building fabrication and support issues. In the preferred embodiment, the vehicle comprises a trailer, a mobile type unit containing enough equipment to handle most tasks used on a construction site, particularly a metal building construction site. All components of the vehicle are constructed of heavy-duty materials to handle the rough terrain of the construction environment and is made to withstand the rigor of a construction site. In the preferred embodiment, the trailer has its own self-contained power and is fully supportive of a mobile metal building factory that is used commonly in the art. The vehicle is designed to serve as a mobile metal factory and will be used in the construction of self-supporting metal structures that are known in the industry, and is fully self-contained, supplying all of the tools and equipment necessary for construction support at the site where the vehicle is located.

16 Claims, 5 Drawing Sheets

U.S. PATENT DOCUMENTS

| | | | |
|---|---|---|---|
| 4,700,567 A * | 10/1987 | Frey et al. | 73/152.39 |
| 4,713,957 A * | 12/1987 | Eder et al. | 72/319 |
| 4,949,945 A * | 8/1990 | Whiteley | 269/71 |
| 4,981,318 A * | 1/1991 | Doane et al. | 296/26.14 |
| 5,169,202 A * | 12/1992 | Cupp et al. | 296/51 |
| 5,439,313 A * | 8/1995 | Blaha et al. | 404/75 |
| 5,507,122 A * | 4/1996 | Aulson | 296/24.38 |
| 5,746,396 A * | 5/1998 | Thorton-Trump | 244/134 R |
| 5,833,294 A * | 11/1998 | Williams et al. | 296/24.32 |
| 5,873,498 A * | 2/1999 | Moore et al. | 222/181.2 |
| 6,038,909 A * | 3/2000 | Zink | 72/319 |
| 6,132,509 A * | 10/2000 | Kuschnereit | 118/64 |
| 6,227,278 B1 * | 5/2001 | Forsland | 160/107 |
| 6,325,435 B1 * | 12/2001 | Dubuc | 296/24.32 |
| 6,394,523 B1 * | 5/2002 | Yoo et al. | 296/24.32 |
| 6,431,628 B1 * | 8/2002 | Bell, Jr. | 296/24.32 |
| 6,565,165 B1 * | 5/2003 | Switkes | 312/249.13 |
| 6,612,008 B1 * | 9/2003 | Thoma | 296/24.32 |
| 6,670,580 B1 * | 12/2003 | Brofft et al. | 219/134 |
| 2002/0140243 A1 * | 10/2002 | Alemagna | 296/24.1 |
| 2004/0140683 A1 * | 7/2004 | Orischak et al. | 296/24.32 |
| 2004/0226930 A1 * | 11/2004 | Radtke | 219/130.1 |

* cited by examiner

MOBILE CONSTRUCTION SUPPORT VEHICLE

TECHNICAL FIELD

This invention relates to metal building construction, and particularly to providing metal building construction equipment at a remote job site. This invention more particularly relates to a self-contained mobile construction support vehicle.

BACKGROUND

In metal building construction, often what amounts to a mobile metal building factory is taken piecemeal to a job site to roll form self-supporting metal buildings. Typically, a construction crew will bring its own tools, welder, sheet metal brake, and various other apparatus to support this construction effort. Just as typically, each of the aforementioned apparatus requires its own ancillary support equipment, which would include at minimum power supply, and tables with anchor mechanisms for stability. Providing sufficient leeway for material feed and storage for each separate apparatus can make a metal building construction job site crowded, inefficient, and even unsafe. Furthermore, each major apparatus requires some means, such as a truck or a trailer towed by a separate vehicle, for transporting the apparatus and its support equipment to the job site. For example, often a welding truck is driven to a job site with a portable engine driven welder, but generally with no other equipment. Tools would also have to be brought to the site. The welding truck would bring the welding tools. Ladders, hammers, wrenches, pry bars, and the like, require their own truck or trailer for delivering these tools to the job site.

Even when all of the equipment described above is delivered to a job site, there are often necessary tasks in metal building construction that cannot be performed onsite using the methods and equipment of the prior art. For example, when a construction crew needs to bend certain metal pieces such as door and window frames, gutters and the like, it is often necessary for the construction crew to leave the job site and go to a metal shop to have these parts made.

Metal building construction requires considerable related foundation work, requiring that concrete construction equipment be delivered and located onsite. Commonly, a concrete construction crew brings tools such as wheelbarrows, concrete vibrators, screeds, bull floats, and the like to the job site in some sort of truck or truck and trailer combination.

Thus, there exists a need in the metal building construction industry for a mobile system that will deliver all the necessary major apparatus and ancillary support equipment for a construction crew. There is a further need for a mobile system that provides the necessary apparatus and support equipment in an arrangement that will provide a workable, efficient and safe job site. Additionally, there exists a need for such a mobile construction support system to provide sufficient stability for the proper operation of the apparatus included in the mobile construction support system. Furthermore, there is a need for a mobile construction support system that includes sufficient metalworking capability to perform tasks that would otherwise be performed offsite. There is also a need in the metal building construction industry for a mobile construction support system that is self-contained.

OBJECTS OF THE INVENTION

In order to overcome the above-mentioned shortcomings of the related art, it is an object of the present invention to provide a mobile construction support system that provides all the necessary equipment for a metal building construction crew.

It is another object of the invention to provide a mobile construction support system that includes the capability to perform ancillary metalworking at the metal building construction job site.

It is a further object of the invention to provide a mobile construction support system that includes a welding machine.

Another object of the invention is to provide a mobile construction support system that includes concrete and foundation fabrication equipment.

It is yet another object of the invention to provide a mobile construction support system that includes workspace suitable for performing tasks associated with metal building construction.

These and other objects of the invention, together with the features and advantages thereof, will become apparent from the detailed specification when read together with the accompanying drawings.

SUMMARY OF THE INVENTION

This invention seeks to overcome the limitations of the prior art and meet the above-listed objects by allowing all the tools to be in one construction support vehicle which eliminates the need for several vehicles being driven to the job site. The invention therefore avoids the negative consequences of several vehicles being driven to the job site, consequences that include traffic safety, congestion at the job site, and confusion over the proper vehicle for retrieval and storage of equipment. In a preferred embodiment, the construction support vehicle of the present invention includes fold-down workbenches. These workbenches are sturdy enough to hold very heavy loads and are suitable for heavy-duty work. The workbenches are used for such tasks as repair work for small components on the metal building machinery and for light fabrication work such as constructing door and window frames. In a further preferred embodiment, these workbenches are completely weather tight, and when brought to the job site, the workbenches fold down and allow quick user interface.

A major limitation of the prior art that this novel construction support vehicle overcomes is the onsite ability to fabricate light gauge sheet metal parts, as well as aluminum parts. A typical problem in the art is making door, window, and ventilator frames; gutters; and other components onsite—these parts are usually taken to a different shop to be fabricated. The construction support vehicle of the present invention solves this problem by having an adequately sized sheet metal brake that will form even the heaviest gauges that are used on the construction site. Typically this would be 16 gauge or 1.5 mm. The metal brake can also bend thicker steels in smaller lengths or thinner steels in larger lengths. The construction support vehicle of the present invention is designed to provide a compact tool equipment and parts carrier for a wide variety of projects and operations used on a typical metal building construction site and is capable of mobilizing both power and hand tools, as well as essential equipment substantially to perform a job in the field. Another novel feature of this invention is the ability of the construction support vehicle to provide its own power source. Such a power source is used to power lighting for the job site for operations at night and is used for powering hand tools such as circular saws, drills, grinder, and any other light power equipment used for metal building construction operations.

DETAILED DESCRIPTION OF THE PREFERRED EMBODIMENTS

Figure 1:
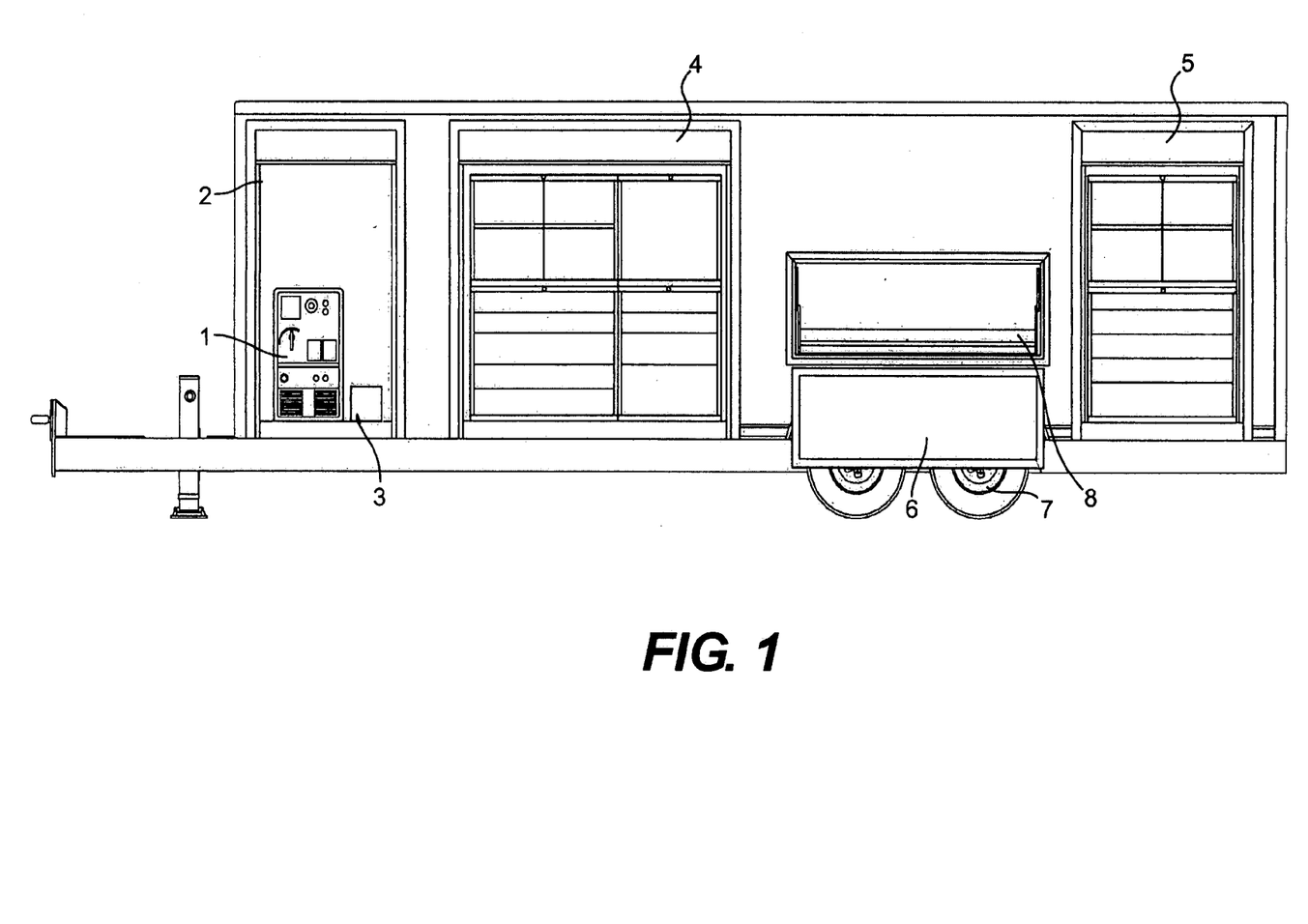
FIG. 1 is a left side elevation showing an embodiment of the mobile construction support system of the present invention.

FIG. 1 depicts a preferred embodiment of the construction support vehicle 9 with multiple equipment and tool compartments 2, 4 and 5, as well as workbench area 8 shown in the open and accessible condition. In the preferred embodiment shown, compartment 2 contains an engine driven welder 1, typically either gas or diesel operated and provides welding operations for the construction site. These welding machines generally include a stick type electrode or wire feeder with long cables to reach the building construction site. The engine driven generator and welder combination 1 also provides electricity for the construction support vehicle. In the embodiment shown, this electricity is provided at both 110 and 220 volts for typical domestic and international operations respectively, and is capable of 50 or 60 Hz frequency operation.

Also in the preferred embodiment shown, compartment 2 contains a small engine driven air compressor 3 for air driven tools. These tools are most commonly air spray guns and air tools such as ratchets and chipping hammers. The air compressor 3 is also used for general maintenance such as the use of blow guns, checking air pressure on tires, and other devices that need a reliable supply of compressed air.

The compartment 4 in the preferred embodiment, shown in the fully open position, houses the largest tool box configuration on the construction support vehicle. The tool box configuration is heavy-duty with cabinet style containers comprising the top portions and roller glide drawers in the lower portion of the tool box. The upper cabinetry includes chop, circular, and band saws; transit, tripod, and rod; chop saw and band saw blades; shears; paint guns; laser equipment; rivet guns, and other tools of the like. The drawers house various tools such as mechanic's wire, wire terminal kit, drills, jacks, screwshooters, grinders, saws, screwdriver sets, air hammers, impact wrenches, cutting and grinding wheels, miscellaneous hardware, and any other necessary tools.

Fold down workbench 8 in the preferred embodiment shown comprises a sturdy wooden type workbench that is mounted to a solid aluminum frame. Workbench 8 folds down within the construction support vehicle. Inside the construction support vehicle there is adequate steel framing from side to side that will allow heavy loads to be supported even when the loads extend off of the edge of the workbench 8. A fold down door 6 is made of an exterior grade sealing material that will allow for weatherproof transportation of the construction support vehicle. Workbench 8 folds down on link arms 29 and provide a horizontal surface for worker use. The height of workbench 8 is in the preferred embodiment a typical height for individuals of average height. Workbench 8 is capable of withstanding very heavy loads for maintenance and light duty fabrication work.

The preferred embodiment of the construction support vehicle 9 as shown in FIG. 1 also has a compartment 5 shown in the open position. Compartment 5 comprises a heavy-duty tool storage area with a cabinet feature above with roller guide drawers below. The top cabinetry includes vise clamps, funnels, cement vibrators, grease, drill bit sharpeners, framing squares, caulking and grease guns, and other tools of the like. The drawers house tools such as soldering guns, tap and die sets, tape measures, socket sets, booster cables, wrenches, funnel spouts, hammer and driver bits, pliers, levels, hammers, utility knives and blades, drill sets, saws, wrench and socket sets, squares, plumb bobs, line reels, grease, bulbs, saw and shear blade, miscellaneous air accessories, and other items of the like.

Figure 2:
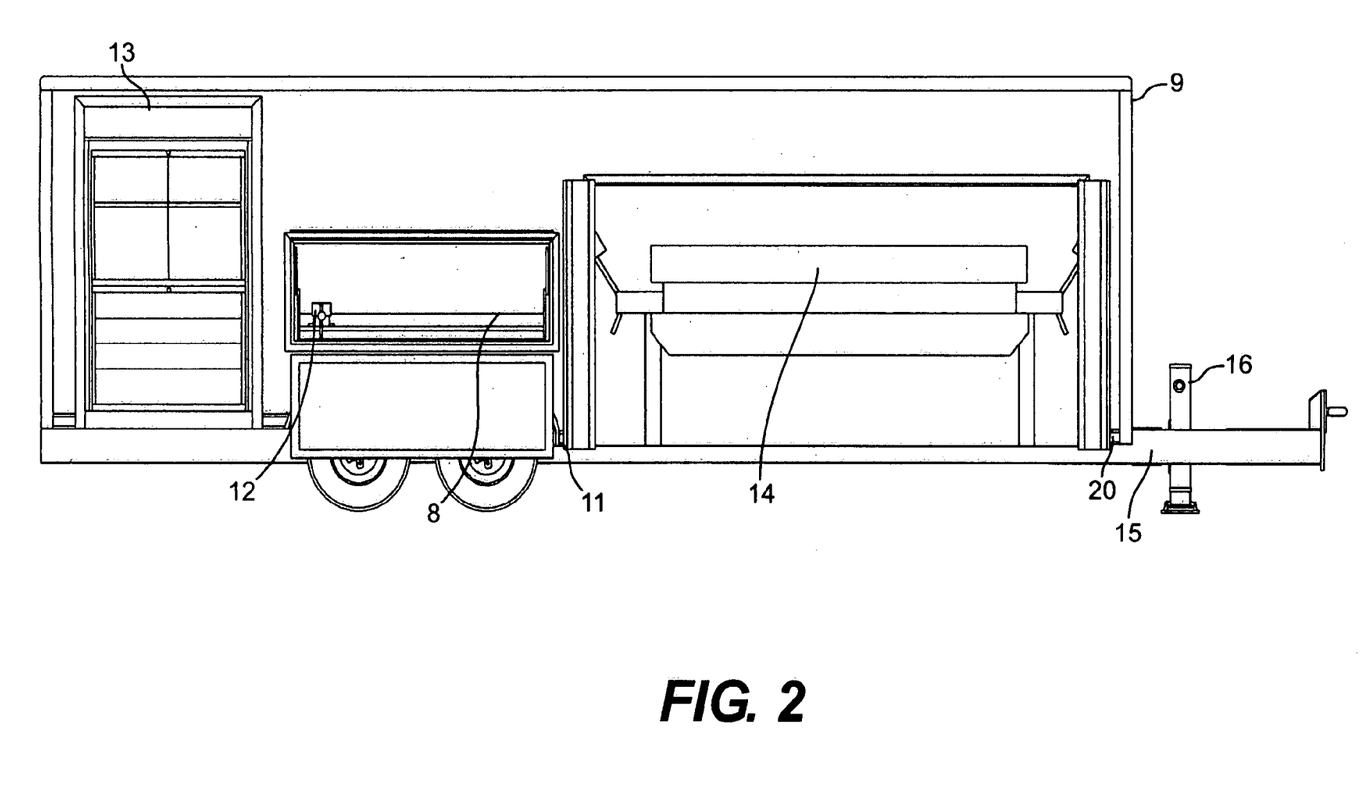
FIG. 2 is a right side elevation showing an embodiment of the mobile construction support system of the present invention.

FIG. 2 shows the right side elevation of a preferred embodiment of the construction support vehicle 9. Shown toward the rear of the vehicle is a storage compartment 13 in the open position. Storage compartment 13 comprises a heavy-duty tool storage area that includes in the preferred embodiment a cabinet feature above with roller guide drawers below. In the preferred embodiment, the tool cabinet in storage compartment 13 is a welding support cabinet and safety cabinet. It has a majority of the items inside for safe operation of the construction support vehicle and the building site and also supplies the necessary tools for use with the welding equipment 9 such as C-clamps, safety harnesses and reels, cable pullers, ear plugs, plasma cutter spare parts, floats, trowels, edgers, tape measures, respirators, safety glasses, welding helmets, welding gloves, welding jackets, miscellaneous welding and cutting items.

FIG. 2 further shows second embodiment of fold down workbench 8 on the right hand side of construction support vehicle 9 further including heavy-duty vice 12 to use for pipe work and to hold items during maintenance and fabrication. As is the case with workbench 8 displayed in FIG. 1, workbench 8 folds up into a storage compartment and is supported by a heavy-duty frame. There is also a fold down door 11 which will securely close the workbench within the trailer and keep it weather tight.

The preferred embodiment of the construction support vehicle 9 includes a main access compartment 14 in the trailer. Main access compartment 14 includes a large double door 23 for enclosing main access compartment 14. Double door 23 is shown in FIG. 2 in the folded and open position, a configuration that provides users with easy access to the entire opening of main access compartment 14. Inside main access compartment 14 is space for a large sheet metal brake. This can be used to bend light gauge steel and aluminum of any dimension within the capacity of main access compartment 14. The main fabrication items for this metal brake are door, window, and ventilator frames, gutters, and other building support pieces used within the metal building industry. The metal brake that is housed with this trailer is typically a box and pan brake. This means the brake can be configurable with ninety degree flanges in a box type manner. Because four sides of a piece of sheet metal can be bent without interfering with the rest of the job, a box and pan brake configuration is more desirable than a standard metal brake where generally only two sides can be bent. This becomes desirable when making filler pieces for metal buildings where the filler pieces need to have screw flanges on all four sides. This metal brake feature of the preferred embodiment of construction support vehicle 9 shown allows a basic sheet metal shop to be delivered to the job site on a heavy-duty trailer. Inside main access compartment 14, above the sheet metal brake, extension ladders (not shown) can be stored. As will be readily understood, in the metal building construction industry extension ladders are ubiquitous for reaching various heights on the metal buildings. Safety equipment and supplies may also be located in main access compartment 14, as well as fire extinguishers and hard hats for the job site. In the preferred embodiment, all compartments within construction support vehicle 9 can be lighted for operation at night.

In the preferred embodiment, construction support vehicle 9 is mounted on a heavy-duty tubular steel frame 15. Frame 15 is capable of withstanding very heavy loads and rough terrain. A leveling device 16 is located in the front. Another leveling system comprises other leveling devices 20 located in each corner of the construction support vehicle. Both of these leveling systems are generally used when the metal brake is being operated. These allow the operator to make the trailer as level as possible so precise bends can be made in the metal framing work.

The construction support vehicle is shown in FIG. 2 mounted to a heavy-duty tandem axle type trailer 7. In the preferred embodiment, heavy-duty tandem axle type trailer 7 includes a rubber spring type suspension. Further in the preferred embodiment, any tires used with heavy-duty tandem axle type trailer 7 are extremely heavy-duty, capable of withstanding the heavy weight of the trailer and the rough terrain.

The construction support vehicle 9 has a towing eye at the front, typically a lunette eye that is standard throughout the construction industry. The eye is adjustable for towing vehicles of different heights and is convenient for operation with most any vehicle on the road today.

Figure 3:
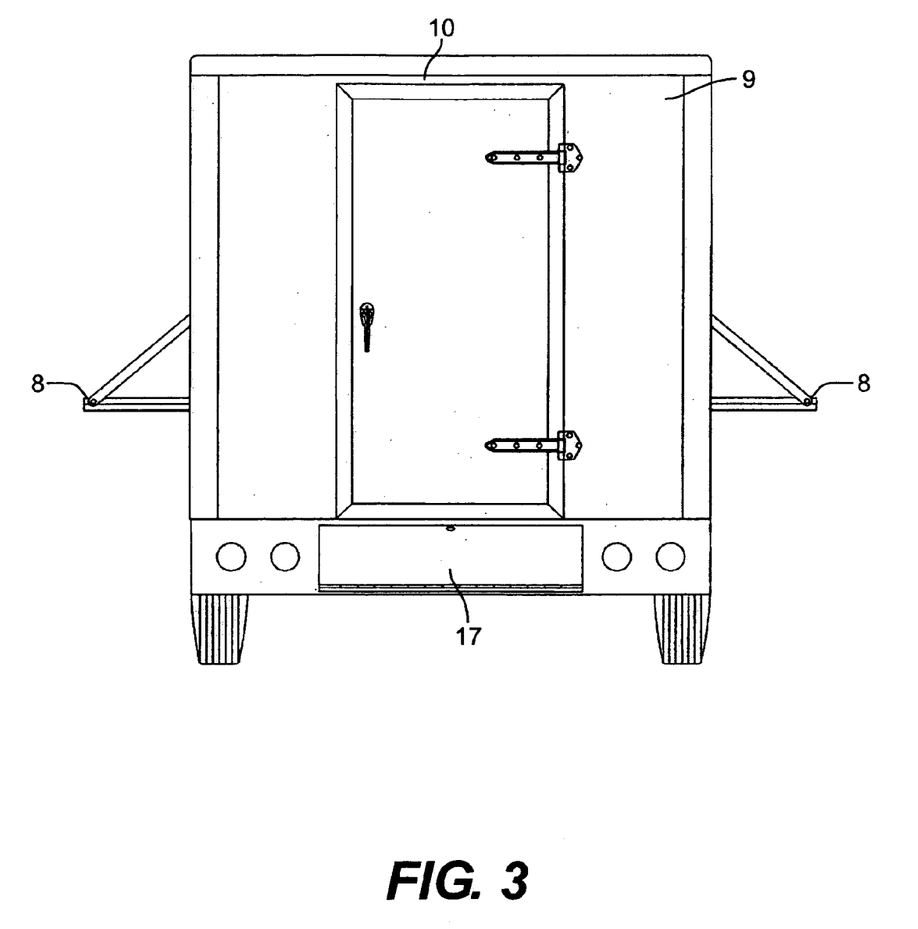
FIG. 3 is a rear elevation of an embodiment of the mobile construction support system of the present invention.

FIG. 3 shows a rear view of the preferred embodiment of construction support vehicle 9 and is shown with a worker access door 10 in the closed position and rear access door 17 also closed. Worker access door 10 allows a user access to an aisle way (not shown) inside the construction support vehicle 9. The construction support vehicle 9 has enough head room for a individual of average height. Inside the aisle way and to one side is a construction box (not shown) for holding various tools such as shovels, hammers, loops and other configurations of reinforcement bar, post hole diggers, pry bars, grounding stakes and drivers, and pop rivets. These tools are typically the most dirty and are all housed inside this box for easy transportation. Also housed inside the construction support vehicle 9 are various components that are large in size and that cannot fit into individual cabinets and drawers. These components typically consist of fans, wheelbarrows, heaters, air hoses, rope, cylinder cart, brooms, extension cords, extension cord reels, battery chargers, safety cans, welding cable, welding rods, and other that are used on a typical job site for supporting the fabrication of self-supporting metal buildings.

The rear view shown in FIG. 3 also shows hinged rear access door 17. Rear access door 17 provides access to an enclosed compartment (not shown) located underneath the bed of heavy-duty tandem axle type trailer 7. This enclosed compartment is an all steel construction in the preferred embodiment. Inside this compartment are long step ladders, as well as large concrete type placement tools such as screeds and bull floats. These are all very long items which fit in this compartment very easily.

Again shown in FIG. 3 are the fold down workbenches 8. FIG. 3 shows clearly the working height level of each fold down workbench 8. The link arms 29 fold down and provide the support needed for working on these benches. These benches can be folded down independently of each other and can be kept in the stored position, if workbenches are not needed.

Figure 4:
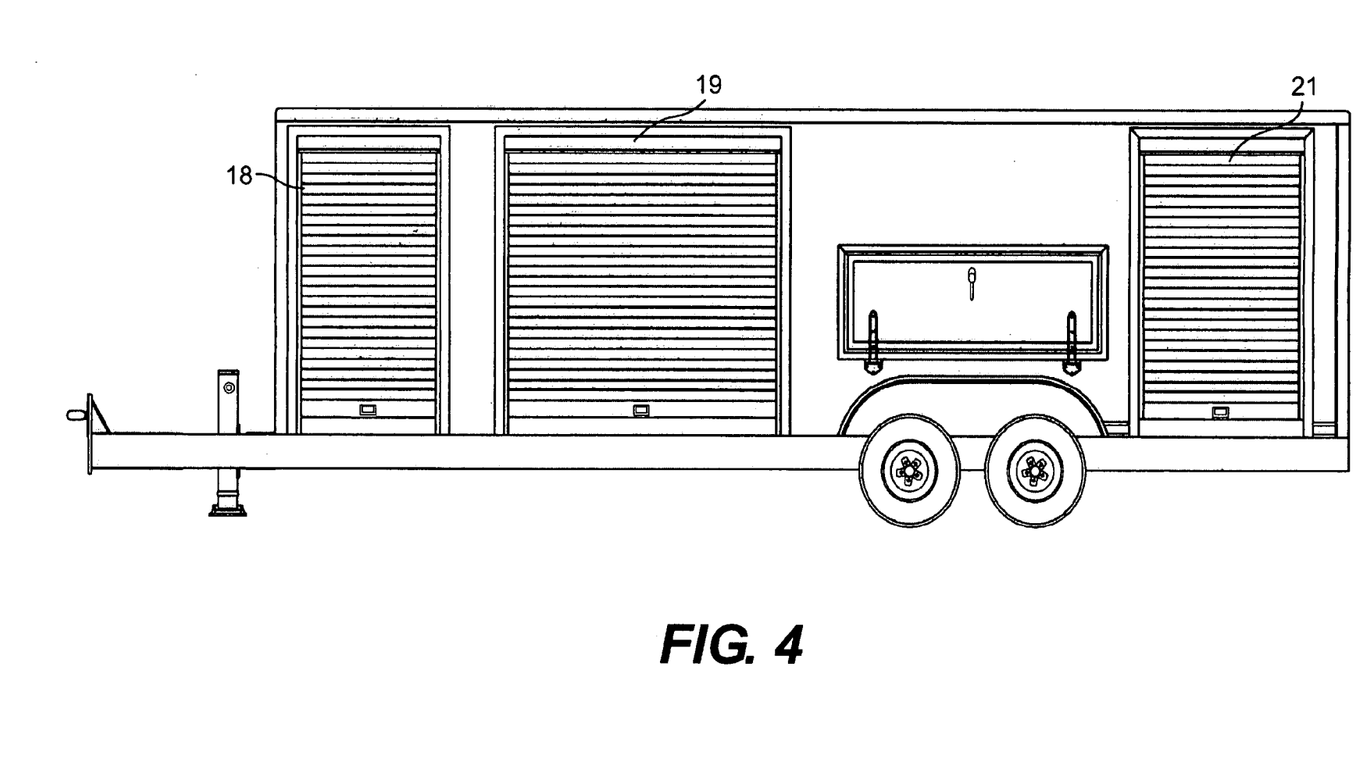
FIG. 4 is a left side elevation showing further details of an embodiment of the mobile construction support system of the present invention.

FIG. 4 shows roll-up doors 18, 19, and 21 in the closed position, enclosing respectively compartments 2, 4 and 5. In the preferred embodiment shown, roll-up doors 18, 19, and 21 are made of an aluminum type structure, similar to large accordion-type roll-up doors used in buildings. These doors roll up into a small cavity so they will be out of sight and clear of most operations.

Figure 5:
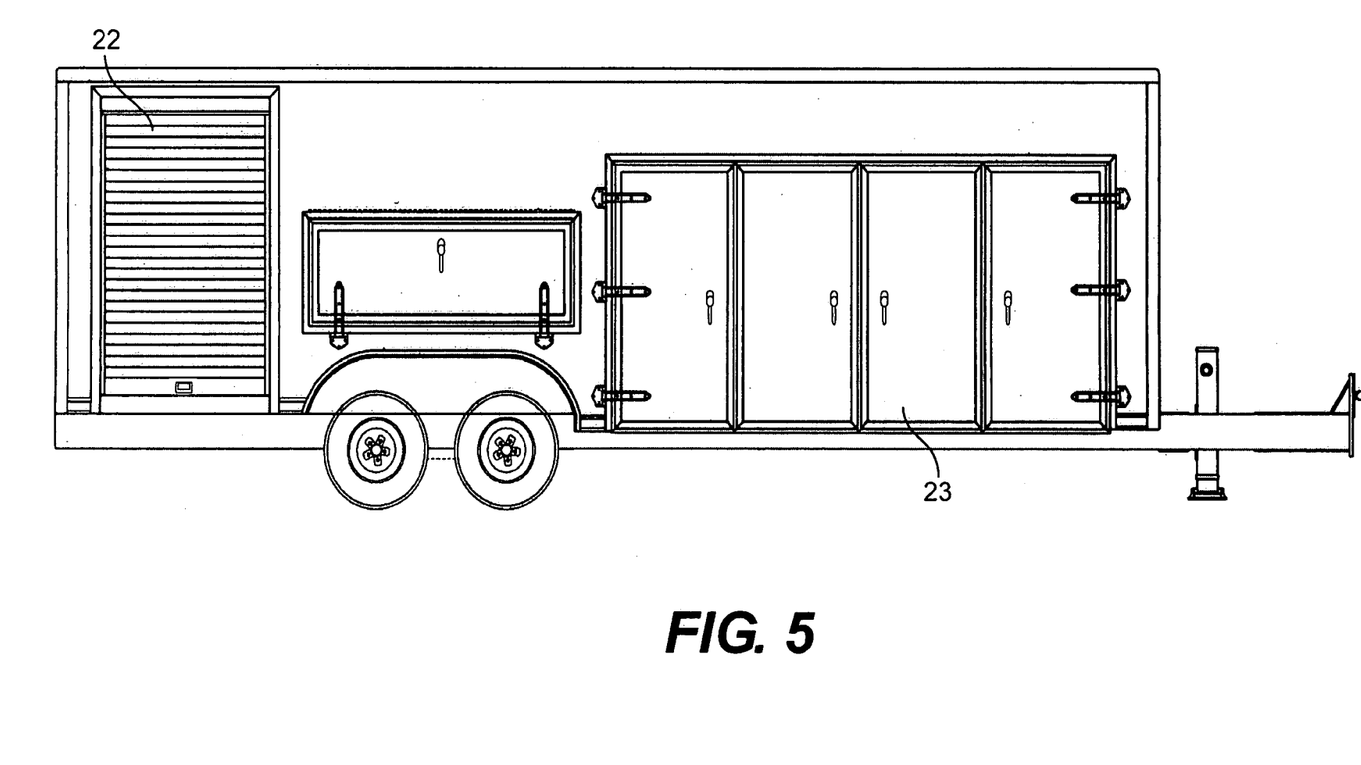
FIG. 5 is a right side elevation showing further details of an embodiment of the mobile construction support system of the present invention.

FIG. 5 shows the right side elevation of a preferred embodiment of the construction support vehicle 9, with all compartment doors in their closed positions. Roll-up door 22 encloses storage compartment 13, fold down door 6 is shown enclosing workbench 8, and large double door 23 is shown in the closed position, enclosing main access compartment 14.

In the preferred embodiment, the entire construction support vehicle 9 is made of heavy-duty materials that are typical for the transportation industry. Further in the preferred embodiment, the vehicle and all access doors are weather tight for typical operations for the construction site.

Although the invention has been described in detail herein with reference to its preferred embodiment and certain described alternatives, it is to be understood that this description is by way of example only, and is not to be construed in a limiting sense. It is to be further understood that numerous changes in the details of the embodiments of the invention, and additional embodiments of the invention will be apparent to and may be made by persons of ordinary skill in the art having reference to this description. It is contemplated that all such changes and additions are within the spirit and true scope of the invention as claimed below. Accordingly, the invention is intended to be limited only by the scope of the appended claims.

What is claimed is:

1. A construction support vehicle having a front area, a rear area, and two sides, said vehicle comprising:

a first compartment accessible at one of said sides and a door for enclosing the first compartment, a sheet metal brake installed in the first compartment, a second compartment accessible at one of said sides and a door for enclosing the second compartment, the second compartment comprising a workbench, a third compartment accessible at one of said sides and a door for enclosing the third compartment, a welder installed in the third compartment, an engine driven electric generator installed in the third compartment, an air compressor installed in the third compartment, a fourth compartment accessible at one of said sides and a door for enclosing the fourth compartment, the fourth compartment comprising a cabinet and a drawer, an aisle way for accessing an interior of the construction support vehicle and a door enclosing the aisle way, a fifth compartment disposed below the aisle way and a door for enclosing the fifth compartment, the fifth compartment having a size suitable for holding a step ladder, and means for transporting said construction support vehicle to a construction site.

2. The construction support vehicle of claim 1, wherein said sheet metal brake comprises a box and pan brake.

3. The construction support vehicle of claim 1, wherein said door enclosing said first compartment is weather-tight.

4. The construction support vehicle of claim 1, wherein said door enclosing said first compartment is a folding door.

5. The construction support vehicle of claim 1, wherein said door enclosing said second compartment is hingedly attached to said construction support vehicle.

6. The construction support vehicle of claim 1, wherein said door enclosing said second compartment is weather-tight.

7. The construction support vehicle of claim 1, wherein said means for transporting said construction support vehicle comprises a trailer.

8. The construction support vehicle of claim 1, wherein said means for transporting said construction support vehicle comprises a truck.

9. An apparatus comprising:
a road vehicle having two opposite side walls,
a first compartment accessible at one of said side walls and a door for enclosing the first compartment,
a sheet metal brake installed in the first compartment,
a second compartment accessible at one of said side walls and a door for enclosing the second compartment, the second compartment comprising a workbench,
a third compartment accessible at one of said side walls and a door for enclosing the third compartment,
a welder installed in the third compartment,
an engine driven electric generator installed in the third compartment,
an air compressor installed in the third compartment,
a fourth compartment accessible at one of said side walls and a door for enclosing the fourth compartment, the fourth compartment comprising a cabinet and a drawer,
an aisle way for accessing an interior of the road vehicle and a door enclosing the aisle way, and
a fifth compartment disposed below the aisle way and a door for enclosing the fifth compartment, the fifth compartment having a size suitable for holding a step ladder.

10. The apparatus of claim 9 wherein the sheet metal brake is a box and pan brake.

11. The apparatus of claim 9 wherein said door enclosing said first compartment is weather-tight.

12. The apparatus of claim 9 wherein said door enclosing said first compartment is a folding door.

13. The apparatus of claim 9 wherein said door enclosing said second compartment is hingedly attached to said road vehicle.

14. The apparatus of claim 9 wherein said door enclosing said second compartment is weather-tight.

15. The apparatus of claim 9 wherein said doors for enclosing the third and fourth compartments are roll-up doors.

16. The construction support vehicle of claim 1 wherein said doors for enclosing the third and fourth compartments are roll-up doors.

* * * * *